United States Patent [19]
Goto et al.

[11] Patent Number: 5,693,719
[45] Date of Patent: Dec. 2, 1997

[54] ETHYLENE POLYMERS

[75] Inventors: Yukitaka Goto; Nobuaki Sakurai; Tadashi Takahashi; Katsumi Hirakawa; Yoichi Maeda; Yoshihiko Sasaki; Satoshi Nishimura; Masataka Souda, all of Yokkaichi, Japan

[73] Assignee: Mitsubishi Chemical Corporation, Tokyo-to, Japan

[21] Appl. No.: 573,427

[22] Filed: Dec. 15, 1995

[30] Foreign Application Priority Data

Dec. 16, 1994 [JP] Japan .................................. 6-313557

[51] Int. Cl.⁶ .................................................. C08L 23/08
[52] U.S. Cl. ........................... 525/324; 525/323; 525/53; 525/240; 525/197; 525/247
[58] Field of Search ............................ 525/197, 53, 324, 525/323, 240, 247

[56] References Cited

U.S. PATENT DOCUMENTS

| | | | |
|---|---|---|---|
| 5,126,398 | 6/1992 | Lee | 525/53 |
| 5,371,145 | 12/1994 | Daniell | 525/240 |
| 5,387,749 | 2/1995 | Govoni | 525/53 |
| 5,405,901 | 4/1995 | Daniell | 525/53 |

FOREIGN PATENT DOCUMENTS

| | | |
|---|---|---|
| 0 041 796 A | 12/1981 | European Pat. Off. . |
| 0 273 284 A2 | 7/1988 | European Pat. Off. . |
| 0 369 436 A2 | 5/1990 | European Pat. Off. . |
| 0 503 791 A1 | 9/1992 | European Pat. Off. . |
| 0 528 523 A1 | 2/1993 | European Pat. Off. . |
| 0 580 930 A1 | 2/1994 | European Pat. Off. . |
| 5-086122 | 4/1993 | Japan . |
| 2 056 996 | 3/1981 | United Kingdom . |
| 94/22948 | 10/1994 | WIPO . |

*Primary Examiner*—Irina S. Zemel
*Attorney, Agent, or Firm*—Oblon, Spivak, McClelland, Maier & Neustadt, P.C.

[57] ABSTRACT

An ethylene polymer which is useful for molding inflation film having a particularly excellent moldability is provided.

The ethylene polymer is obtainable by the first and second steps and satisfying the following conditions (a) to (d):

(a) the polymer produced in the first polymerization step having an weight average molecular weight ($Mw_1$) in the range of $6 \times 10^5$ to $4 \times 10^6$;

(b) the ratio ($Mw_2/Mw_1$) of the weight average molecular weight of the polymer produced in the first polymerization step ($Mw_1$) and the weight average molecular weight of the polymer produced in the second polymerization step ($Mw_2$) being in the range of 0.7 to 1.4;

(c) the molecular weight in which the integration fraction from the low molecular weight is equal to ½ of the weight fraction ($W_2$) of the polymer produced in the second polymerization step being in the range of $5 \times 10^3$ to $3 \times 10^4$; and (d) the weight fraction ($W_1$) of the polymer produced in the first step being in the range of 0.45 to 0.70, and the weight fraction ($W_2$) of the polymer produced in the second step being in the range of 0.30 to 0.55.

13 Claims, 1 Drawing Sheet

ETHYLENE POLYMERS

BACKGROUND OF THE INVENTION

1. Field of the Invention

The present invention relates to a novel ethylene polymer. More particularly, it provides a polyethylene having specific compositional features and obtainable by continuous polymerization in the presence of a Ziegler type catalyst, particularly continuous vapor phase polymerization, and particularly it provides an improved ethylene polymer which has an excellent precessability and impact resistance suitable for film forming and can avoid problem of fish eye.

2. Background Art

For films obtained form a high density polyethylene resin, particularly films obtained by inflation molding, and for blow molding, use has been made of a polyethylene comprising a low molecular weight component and a high molecular weight component, that is a polyethylene having the so-called bimodal molecular weight distribution. Techniques for preparing the polyethylene in the vapor phase continuous polymerization have been described in Japanese Patent Laid-Open Publication Nos. 86122/1993 and 202129/1993, but as far as we know, these techniques are likely to result in only such polyethylene which has poor moldability/formability and low productivity. Specifically, increased rate in the blow-up process for preparing an inflation film may cause unstable bubbles which made it impossible to form film, so that these techniques could not be said satisfactory in the point of productivity. Also, in the presence of a high level of an inorganic filler, uneven thickness tends to happen due to the uneven distribution of the thickness formed in the resin extrudate, and thus it may be difficult to produce films endowed with excellent quality.

The ethylene polymers according to the conventional techniques described above are not at a level satisfactory as an ethylene polymer for the molding of inflation films, and it is desired to improve moldability/formability, in particular.

SUMMARY OF THE INVENTION

The object of the present invention is to provide an improved ethylene polymer which has an excellent processability and impact resistance and can avoid the problem of generating fish eyes. Different from an ethylene polymer having a simple bimodal molecular weight distribution obtained by continuously conducting the polymerization wherein a high molecular weight component is produced and the polymerization wherein a low molecular weight component is produced, the present invention provides a high quality ethylene polymer which has an improved state of dispersion of a high molecular weight component and a low molecular weight component produced by polymerizing an ethylene polymer to form a super high molecular weight as a high molecular weight component during the polymerization where a polyethylene of a low molecular weight is produced as a low molecular weight component, and which particularly has extensively improved moldability/formability which could not be obtained by the conventional methods. In this context, an "ethylene polymer" herein means both the homopolymer and copolymer of ethylene.

The present invention has been done as a result of examination conducted in order to solve the above described problems, and particularly the moldability/formability has been improved when an ethylene polymer is produced in accordance with the present invention so it meets a variety of requirements of physical properties.

The present invention thus provides an ethylene polymer which is a homopolymer of ethylene or a copolymer of ethylene with an α-olefine having 3 to 10 carbon atoms which is obtainable by performing a first polymerization step and then a second polymerization step in which polymerization is continuously conducted in the presence of a polymer obtained in the first polymerization step, said ethylene polymer satisfying the following conditions (a) to (d) that:

(a) the polymer produced in the first polymerization step has an weight average molecular weight ($Mw_{,1}$) in the range of $6\times10^5$ to $4\times10^6$;

(b) the ratio ($Mw_{,2}/Mw_{,1}$) of the weight average molecular weight of the polymer produced in the first polymerization step ($Mw_{,1}$) and the weight average molecular weight of the polymer produced in the second polymerization step ($Mw_{,2}$) being in the range of 0.7 to 1.4;

(c) the molecular weight at which the integration fraction from the low molecular weight is equal to ½ of the weight fraction ($W_2$) of the polymer produced in the second polymerization step is in the range of $5\times10^3$ to $3\times10^4$; and (d) the weight fraction ($W_1$) of the polymer produced in the first step is in the range of 0.45 to 0.70, and the weight fraction ($W_2$) of the polymer produced in the second step is in the range of 0.30 to 0.55.

According to the present invention, there can be provided an ethylene polymer which has, among others, excellent moldability and is thus useful for the inflation molding for producing films.

DETAILED DESCRIPTION OF THE INVENTION

1. Ethylene Polymer

The ethylene polymer according to the present invention is, as described above, a homopolymer of ethylene or a copolymer of ethylene with an α-olefin having 3–10 carbon atoms which has been obtained by performing a first polymerization step and then a second polymerization step in which polymerization is continuously conducted in the presence of a polymer obtained in the first polymerization step, and the ethylene polymer satisfies the certain conditions (a)–(d).

The term "ethylene polymer" herein means, as described above, both the homopolymer and copolymer of ethylene. In addition, a comonomer component other than ethylene in the case of the ethylene polymer being a copolymer is typically an α-olefin having 3–10 carbon atoms, but it is not limited solely thereto and a further comonomer can additionally be copolymerized.

Specific examples of the α-olefin having 3–10 carbon atoms which are used in the present invention according to necessities preferably include propylene, butene-1, hexene-1, 4-methylpentene-1, octene-1 and decene-1, among these olefines butene-1, hexene-1 and octene-1 being preferred. These α-olefins can be used in combination of the two or more.

The ethylene polymer according to the present invention preferably has a density in the range of 0.940–0.960 g/cm³.

The content of the α-olefin having 3–10 carbon atoms is controlled so that the ethylene polymer has a density within the range described above. If the density is less than 0.940 g/cm$^3$, a film obtained is excessively pliable, and if the density exceeds 0.960 g/cm$^3$, the impact strength is undesirably lowered. Specifically, the α-olefin as a comonomer is used in an amount of no higher 5% by weight, preferably 0.05–3% by weight, of the ethylene polymer produced.

The α-olefin having 3–10 carbon atoms can be introduced of the total amount into the first polymerization step or solely into the second polymerization step. Alternatively, the α-olefin can be introduced in part into the first polymerization step and the balance into the second polymerization step. The preferred embodiment in the present invention is the third embodiment given above, and in a more preferred monomer the α-olefin having 3–10 carbon atoms is introduced in a larger amount into the second polymerization step rather than into the first polymerization step.

The ethylene polymer according to the present invention satisfies the specific conditions (a)–(d). The physical properties in the conditions (a)–(d) are those measured under the measuring conditions by the measuring methods employed in examples (described below).

The ethylene polymer according to the present invention is defined by a variety of physical properties in which the signals of the respective physical properties are represented below:

Weight average molecular weight:

polymer from only the first polymerization step=$Mw_{,1}$,
polymer from only the second polymerization step=$Mw_{,2}$,
final ethylene polymer=$Mw$, weight fraction:

polymer from only the first polymerization step=$W_1$,
polymer from only the second polymerization step=$W_2$, molecular weight at which the integration fraction from the low molecular weight of the final ethylene polymer equals to ½ of $W_2$=$M_2$ In this connection, the weight average molecular weight $Mw_{,1}$ and $Mw$ were measured by the SEC-LALLS method, which will be described below, and the weight fraction $W_1$ and the molecular weight $M_2$ were measured by the SEC method, which will be described below.

In addition, since the second polymerization step takes place as a continuation of polymerization conducted in the presence of a polymer produced in the first polymerization step, the product after the second polymerization step is a mixture of the products in respective steps, and thus the physical properties from only the second polymerization step, that is, $Mw_{,2}$, and $W_2$ should be calculated as follows.

The physical properties from only the second polymerization step are calculated from the following equation with the weight average molecular weight of the polymer from only the first polymerization step ($Mw_{,1}$) and the weight average molecular weight of the final ethylene polymer ($Mw$):

$$Mw_{,2} = \frac{Mw - Mw_{,1} \times W_1}{W_2},$$

$W_2 = 1 - W_1$.

The condition (a) now relates to the weight average molecular weight of the polymer produced in the first polymerization step ($Mw_{,1}$).

The polymer produced in the first polymerization step has a weight average molecular weight ($Mw_{,1}$) in the range of $6 \times 10^5$ to $4 \times 10^6$, preferably $6 \times 10^5$ to $2 \times 10^6$, more preferably $8 \times 10^5$ to $2 \times 10^6$. If the polymer in this polymerization step has a weight average molecular weight ($Mw_{,1}$) less than $6 \times 10^5$, the film strength is lowered; if it exceeds $4 \times 10^6$, the melt viscosity of the polymer is undesirably increased, so that the amount of an extrudate during molding is severely decreased and fish eye tends to appear.

The condition (b) relates to the ratio ($Mw_{,2}/Mw_{,1}$) of the weight average molecular weight of the polymer produced in the first polymerization step ($Mw_{,1}$) and the weight average molecular weight of the polymer produced in the second polymerization step ($Mw_{,2}$).

The ratio ($Mw_{,2}/Mw_{,1}$) is in the range of 0.7 to 1.4, preferably 0.8 to 1.4, more preferably 0.8 to 1.3, which means that $Mw_{,1}$ and $Mw_{,2}$ are made closer to each other. According to the present invention, the dispersibility of the high molecular weight component and the low molecular weight component can be improved extensively and the properties on molding can be also improved extremely due to this feature that the weight average molecular weight of the low molecular weight component is set, even though it is a low molecular weight component, nearer to that of the high molecular weight component. If the ratio is less than 0.7, the stability of bubbles is lowered extensively, and if it exceeds 1.4, fish eye may appear.

The condition (c) relates to the molecular weight ($M_2$) at which the integration fraction from the low molecular weight is equal to ½ of the weight fraction ($W_2$) of the polymer produced in the second polymerization step.

The molecular weight ($M_2$) has a value in the range of $5 \times 10^3$ to $3 \times 10^4$, preferably $5 \times 10^3$ to $2 \times 10^4$. If $M_2$ is less than $5 \times 10^3$, the polymers produced in the second polymerization step and in the first polymerization step are dispersed only poorly, and produce fish eye thus lowering the quality of films produced. If it exceeds $3 \times 10^4$, the viscosity of the product is undesirably increased to make the molding impossible.

The condition (d) relates to the weight fraction of the polymer produced in the first polymerization step and the weight fraction of the polymer produced in the second polymerization step. The weight fraction ($W_1$) of the polymer produced in the first polymerization step is in the range of 0.45 to 0.70, preferably 0.45 to 0.60, and the weight fraction ($W_2$) of the polymer produced in the second polymerization step is in the range of 0.30 to 0.55, preferably 0.40 to 0.55.

The preferred ethylene polymer according to the present invention has the conditions (a)–(d) in the following ranges:

$MW_{,1}$: $6 \times 10^5$ to $2 \times 10^6$
$MW_{,2}/MW_{,1}$: 0.8 to 1.4
$M_2$: $5 \times 10^3$ to $2 \times 10^4$
$W_1$: 0.45 to 0.60
$W_2$: 0.40 to 0.55

The more preferred ranges:

$Mw_{,1}$: $8 \times 10^5$ to $2 \times 10^6$
$Mw_{,2}/Mw_{,1}$: 0.8 to 1.3
$M_2$: $5 \times 10^3$ to $2 \times 10^4$
$W_1$: 0.45 to 0.60
$W_2$: 0.40 to 0.55

In addition, the melt index (MI) of the ethylene polymer according to the present invention is not determined automatically by the molecular weight and the compositional ratio of the high molecular weight component and the low molecular weight component ingredient, but it is a factor associated with the properties of the ethylene polymer. The ethylene polymer according to the present invention has a MI generally in the range of 0.02 to 0.7 g/10 min, particularly for film molding in the range of 0.02 to 0.2 g/10 min, preferably 0.03 to 0.1 g/10 min. If the MI is less than 0.02 g/10 min, the processability is lowered due to the increased load on processing; if it exceeds 0.2 g/10 min, the film strength is decreased undesirably.

To the ethylene polymer according to the present invention, substances which can be conventionally added to or blended with polyolefins such as a heat stabilizer, an anti-oxidant, a ultraviolet light absorber, a pigment, a lubricant, a filler, the other polyolefins, a thermoplastic resin and a rubber can be added according to the necessities.

2. Production of the Ethylene Polymer

The ethylene polymer according to the present invention can be prepared by carrying out the first and second polymerization steps in the presence of a catalyst comprising a titanium solid catalyst component and an organoaluminum compound component.

<Titanium Solid Catalyst Ingredient>

As the titanium solid catalyst component, a titanium catalyst which is supported on a $MgCl_2$— containing containing support and can be used for the preparation of an ethylene polymer having a comparatively wide molecular weight distribution is preferred.

Preferred as the titanium solid catalyst component are:

(1) a solid catalyst component formed by contacting a $MgCl_2$-Ti support which is formed by contacting $MgCl_2$ with a titanium tetraalkoxide with a halide of Si, Ti or Al, such as the one described in Japanese Patent Laid-Open Publication Nos. 12903/1984, 285605/1992, 323206/1992, 348109/1992 or 295027/1993, (2) a solid catalyst component formed by contacting a Mg-Ti solution which is obtained by contacting a magnesium alkoxide or a Mg metal with a titanium alkoxide and optionally an alcohol with an alkylaluminum halide, such as the one described in Japanese Patent Laid-Open Publication Nos. 285606/1992 or 173012/1990, (3) a solid catalyst component formed by milling $MgCl_2$ and a titanium halide or heating them into reaction, such as the one described in Japanese Patent Publication Nos. 46269/1972, 41676/1972 or 16167/1981, (4) a solid catalyst component formed by contacting a titanium ingredient comprising a magnesium halide, a titanium halide, and a porous inorganic oxide such as silica or alumina with a halide of Al and/or B, which is the one described for example in Japanese Patent Laid-Open Publication Nos. 233107/1985 and 172416/1994.

Among these solid catalyst components, those described in the groups (1) and (2) may be preferably used.

The following are the summaries of the preferred titanium solid catalyst components in the present invention, that is, those described in Japanese Patent Laid-Open Publication Nos. 12903/1984, 285605/1992, 323206/1992, 348109/1992 or 295027/1993 set forth in the group (1)(see these publications as for the details)

(a) Japanese Patent Laid-Open Publication No. 12903/1984

A catalyst ingredient for olefin polymerization, which is the contact product of the following ingredients (A) to (B) or (A) to (C):

ingredient (A): a solid composition comprising the following ingredients (A-1), (A-2) and (A-3);
ingredient (A-1): a magnesium dihalide,
ingredient (A-2): a titanium tetraalkoxide and/or a polytitanate represented by the formula $R^2O$-[Ti $(OR^1)(OR^4)$—O]$_n$—$R^3$, wherein $R^1$, $R^2$, $R^3$ and $R^4$ represent a hydrocarbyl group, respectively, and n denotes a number of 2 or more.
ingredient (A-3): a polymeric silicon compound having the structure represented by the formula—Si($R^5$)(H)—O—, wherein $R^5$ represents a hydrocarbyl group;
ingredient (B): an aluminum halide;
ingredient (C): a liquid titanium compound and/or a silicon halide compound.

(b) Japanese Patent Laid-Open Publication No. 285605/1992

A solid component for a Ziegler type catalyst obtained by contacting sequentially the following ingredients (A-2), (A-3), (A-4) and (A-5) into contact with the ingredient (A-1):

ingredient (A-1): a solid catalyst ingredient comprising the following ingredients (A-1-i), (A-1-ii) and (A-1-iii),
ingredient (A-1-i): a magnesium dihalide,
ingredient (A-1-ii): a titanium tetraalkoxide and/or a polytitanate,
ingredient (A-1-iii): a polymeric silicon compound having the structure represented by the formula—Si $(R^1)(H)$—O—, wherein $R^1$ represents a hydrocarbyl group;
ingredient (A-2): a silicon halide compound;
ingredient (A-3): an organoaluminum compound;
ingredient (A-4): a halogenated hydrocarbon;
ingredient (A-5): an organoaluminum or aluminum halide compound.

(c) Japanese Patent Laid-Open Publication No. 323206/1992

A solid component for a Ziegler type catalyst which is obtained by contacting the ingredient (A-3) with the contact product of the ingredients (A-1) and (A-2):

ingredient (A-1): a solid catalyst component comprising the following ingredients (A-1-i), (A-1-ii) and (A-1-iii),
ingredient (A-1-i): a magnesium dihalide,
ingredient (A-1-ii): a titanium tetraalkoxide and/or a polytitanate,
ingredient (A-1-ill): a polymeric silicon compound having the structure represented by the formula —Si($R^1$)(H)—O—, wherein $R^1$ represents a hydrocarbyl group;
ingredient (A-2): a silicon halide compound;
ingredient (A-3): a contact product of the following ingredients (A-3-i) and (A-3-ii),
ingredient (A-3-i): a halogenated hydrocarbon compound,
ingredient (A-3-ii): an aluminum halide compound.

(d) Japanese Patent Laid-Open Publication No. 438109/1992

A solid component for a Ziegler type catalyst which is obtained by contacting the ingredients (A-3) and (A-4) with the contact product of the ingredients (A-1) and (A-2):

ingredient (A-1): a solid catalyst component comprising the following ingredients (A-1-i), (A-1-ii) and (A-i-iii),
ingredient (A-1-i): a magnesium dihalide,
ingredient (A-1-ii): a titanium tetraalkoxide and/or a polytitanate,
ingredient (A-1-iii): a polymeric silicon compound having the structure represented by the formula —Si($R^1$)(H)—O—, wherein $R^1$ represents a hydrocarbyl group;
ingredient (A-2): a silicon halide compound;

ingredient (A-3): a halogenated hydrocarbon, ingredient (A-4): an organoaluminum compound.

(e) Japanese Patent Laid-Open Publication No. 295027/1993

A solid component for a Ziegler type catalyst which is obtained by contacting sequentially the ingredients (A-2) and (A-3) with the ingredient (A-1), washing the contact product and then contacting the ingredient (A-4) with the product:

ingredient (A-1): a solid catalyst component comprising the following ingredients (A-1-i), (A-1-ii) and (A-i-iii), ingredient (A-1-i): a magnesium dihalide, ingredient (A-1-ii): a titanium tetraalkoxide and/or a polytitanate, ingredient (A-1-iii): a polymeric silicon compound having the structure represented by the formula—Si($R^1$)(H)—O—, wherein $R^1$ represents a hydrocarbyl group;

ingredient (A-2): an organoaluminum compound;

ingredient (A-3): a silicon halide compound;

ingredient (A-4): an organoaluminum halide compound.

In the present invention, a catalyst which is capable of producing an ethylene polymer having a narrow molecular weight distribution would not form any active point capable of producing a super high molecular weight ethylene polymer, and as will be shown in comparative examples (which will be described below in details), no advantages inherent in the present invention would be obtained.

These solid catalyst components based on titanium can, before it is used as the catalyst component for the two step polymerization, be subjected to preliminary polymerization in that the solid catalyst component is contacted with an α-olefin such as ethylene, propylene or butene to polymerize a small amount of the α-olefin. Use of such a solid catalyst component as has undergone the preliminary polymerization comprises one preferred embodiment of the present invention.

Preliminary polymerization can be conducted in either the vapor phase method or the slurry method. As the solvent in the case of the preliminary polymerization in the slurry method, the one employed in the usual slurry method such as butane, pentane, hexane and heptane can be employed. These solid catalyst components are used generally in combination with an activator as shown in the above described patent publications. As the organoaluminum compound used as the activator, the one represented by the formula $R'_nAlX_{3-n}$, wherein R' represents a hydrocarbyl group having 1–10 carbon atoms, X represents hydrogen, halogen, an alkoxy or trialkylsiloxy group having 1–12 carbon atoms, and n denotes 1, 2 or 3, is employed. Specifically, use can preferably be made of (a) a trialkylaluminum (n=3) such as triethylaluminum, tri-iso-butylaluminum, and tri-n-hexylaluminum, (b) an alkylaluminum halide (n=1, 1.5 or 2, above all, 1.5 or 2, X=halogen) such as diethyl-aluminum chloride, di-iso-butylaluminum chloride, and ethylaluminum sesquichloride, (c) an alkylaluminum alkoxide (n=1, 1.5 or 2, above all 2, X=alkoxide) such as diethylaluminum ethoxide, (d) an alkylaluminum trialylsiloxide (n=1, 1.5 or 2, above all 2, X=trimethylsiloxy) such as diethylaluminum trimethylsiloxide, and the like. Among these activators, triethylaluminum, tri-iso-butylaluminum and diethylaluminum chloride can preferably be used.

These organoaluminum compounds can also be used in admixture within and/or between the groups (a) to (d).

<Organoaluminum Compound Component>

The solid catalyst component is combined with an organoaluminium compound component to make up a catalyst for the polymerization to produce the ethylene polymer in accordance with the present invention.

In general, an aluminum compound represented by the formula $R_mAlY_{3-m}$ wherein R represents a hydrocarbyl group having 1–10 carbon atoms, Y represents hydrogen or halogen, and m denotes 2 or 3, is preferably used.

Specific examples of the preferred organoaluminum compounds include (1) a trialkylaluminum (m=3) such as triethylaluminum, tri-iso-butylaluminum, and tri-n-hexyl-aluminum, (2) a dialkylaluminum hydride (m=2) such as a diethylaluminum hydride, and a di-iso-butylaluminum hydride, (3) a dialkylaluminum chloride (m=2) such as diethylaluminum chloride, and di-iso-butylaluminum chloride. Among these compounds, tri-iso-butylaluminum is preferred. In addition, the organoaluminum compounds can also be used in admixture within and/or between groups (1)–(3).

<Making Up of Catalyst>

The solid catalyst component and the organoaluminum compound component described above can be combined into an active catalyst by contacting these components outside and/or within the polymerization vessel according to the method conventionally used for Ziegler type catalysts.

It is considered that the organoaluminum compound component which is usually in a liquid form is introduced into a reaction system without trouble. In many cases including the preliminary polymerization, the solid catalyst components can be introduced as a solid into the reaction system carried on an inert gas such as $N_2$, suspended in a low boiling saturated hydrocarbon compound such as butane, pentane, hexane or heptane, or suspended in a saturated hydrocarbon of relatively high viscosity and having 20–40 carbon atoms.

<Polymerization Conditions>

In order to obtain the polymer according to the present invention, it is extremely important to select the polymerization conditions in addition to the catalysts.

The ethylene polymer according to the present invention produced by practicing the first and second polymerization steps can be produced by carrying out the first and second polymerization steps in only one polymerization vessel, or in a polymerization apparatus comprising the first vessel for carrying out the first polymerization step and the second vessel for carrying out the second polymerization step which is connected to the first reactor. In the present invention, the latter method for continuously producing the polymer, particularly the continuous polymerization method, is preferred.

The second polymerization step is conducted as a continuation of the first polymerization step.

The phraseology "conducted as a continuation of the first polymerization" means herein that the catalyst activity which the process product of the first polymerization step still has is utilized as at least a part of the polymerization activity in the second polymerization step, and it does not exclude the addition of the solid catalyst component and/or the organoaluminum compound component which may be identical with or different from the ones used in the first polymerization step.

Polymerizations both in the first and second steps are generally conducted by the vapor phase method in a fluidized bed, which is the preferred method. Accordingly, in the present invention, it is particularly preferable to conduct the first and second polymerization steps by the continuous vapor phase method in two reactors. More particularly, a preferred vapor phase method in a fluidized bed comprises polymerization ethylene in the first reaction vessel for producing a higher molecular weight ethylene polymer and in the second polymerization vessel connected to the first vessel and for producing a lower molecular weight ethylene polymer, and transferring the polymer produced in the first vessel continuously from the first reactor to the second vessel in which the polymerization continues as the second step polymerization. The solid catalyst component is generally supplied solely to the first vessel although no limitation is imposed thereto.

Since the concentration of the solid catalyst component supplied in the first reactor depends on the activity of the solid catalyst component used, it would not be practical to set forth its level independently. The concentration of the solid catalyst component can, however, be set forth in terms of a relative ratio to the organoaluminum compound component supplied as the activator, and the molar ratio of Ti/Al is generally in the range of $1/10$ to $1/1,000$, preferably $1/20$ to $1/500$.

Polymerization is conducted under the following conditions.

<First Polymerization Step>

This step is the one in which the higher molecular weight component of the ethylene polymer is primarily produced. In this step, the polymerization conditions are selected so that a polymer satisfying the above described conditions (a)–(d) is finally obtained.

The organoaluminum compound has a concentration as a proportion to the amount of the polymer present in the first polymerization step generally in the range of 0.2 to 20 (mole/wt) ppm, preferably 1 to 10 (mole/wt) ppm. The density of the polymer is controlled by an amount of an α-olefin in the monomer, and the volume ratio of the α-olefin/ethylene is generally in the range of 0 to 0.1, preferably 0 to 0.05. The molecular weight of the polymer produced is primarily controlled by $H_2$ added in the monomer, and the volume ratio of $H_2$/ethylene is generally in the range of 0.01 to 0.2, preferably 0.02 to 0.15. Temperature is generally in the range of 70° to 100° C., preferably 80° to 95° C. Polymerization period is generally in the range of 1 to 10 hours, preferably 2 to 4 hours. Among these conditions, the concentration of the organoaluminum compound, the ratio of α-olefin/ethylene and the polymerization temperature are particularly important. A polymer having a higher molecular weight can be formed by decreasing the concentration of the organoaluminum compound and the volume ratio of α-olefin/ethylene within the above described range and increasing the polymerization temperature within the above described range.

<Second Polymerization Step>

This step is the one in which the lower molecular weight component of the ethylene polymer is primarily produced. Also, in this step, the polymerization condition is selected so that a polymer satisfying the above described conditions (a)–(d) is finally obtained.

The organoaluminum compound has a concentration as a proportion to the amount of the polymer present in the second polymerization step generally in the range of 0.1 to 20 (mole/wt) ppm, preferably 0.5 to 10 (mole/wt) ppm. The volume ratio of the α-olefin/ethylene is generally in the range of 0.005 to 0.1, preferably 0.015 to 0.05. The volume ratio of $H_2$/ethylene is generally in the range of 1 to 3.5, preferably 1.3 to 3. Temperature is generally in the range of 108° to 120° C., preferably 110° to 115° C. Polymerization period is generally in the range of 1 to 10 hours, preferably 2 to 4 hours. Among these conditions, the polymerization temperature and polymerization period are particularly important. A polymer having a higher molecular weight can be formed by increasing the polymerization temperature and the polymerization period within the above described ranges. In addition, the molecular weight of the polymer can be further increased with the combinations of the reaction conditions in the first and second polymerization steps.

EXAMPLE

In examples and comparative examples, the following measurements and measuring conditions were employed.

<Weight Fraction ($W_1$) of the Polymer Produced in the First Polymerization Step>

The weight fraction ($W_1$) of the polymer (high molecular weight component) produced in the first polymerization step was obtained by measuring the molecular weight distribution of the ethylene polymer obtained after the second polymerization step, namely a final polymer, and the molecular weight distribution of the ethylene polymer obtained in the first polymerization step by size exclusion chromatography (SEC), so that the molecular weight distribution of the high molecular weight component produced in the first polymerization step accords with the molecular weight distribution in the higher molecular weight side of the final polymer obtained after the second polymerization step. Specific measurement conditions and measuring methods in detail are shown below.

Measurement of the Molecular Weight Distribution

SEC (150C ALC/GPC): Waters,

Column: AD80M/S×3, Showa Denko K.K., Japan

Solvent: o-dichlorobenzene, Wako Pure Chemical Industries, Ltd., Special Grade Chemical, Temperature: 140° C., Injection volume: 200 μl, Concentration: 1 mg/ml (first polymerization step), 2 mg/ml (second polymerization step), BHT* was added to sample solvents in a concentration of 2 mg/ml.

Flow rate: 1 ml/min,

Detector: MIRAN 1A, wave length: 3.42 μm.

*: 3,5-di-tert-butyl-4-hydroxytoluene.

A universal calibration curve was prepared with monodisperse polystyrene (PS) and converted into the molecular weight of polyethylene (PE). The relationship between the intrinsic viscosity and the molecular weight was represented by the following equations.

$$[\eta]=1.079\times10^{-4}\times M^{0.723} \text{ (polystyrene)}$$

$$[\eta]=3.915\times10^{-4}\times M^{0.733} \text{ (polyethylene)}$$

The fraction ($W_1$) of the polymer ingredient produced in the first polymerization step was calculated with a normalized molecular weight distribution curve obtained by the above described measurement (SEC). Specifically, the fraction ($W_1$) was obtained so that the molecular weight distribution curve in the higher molecular weight side than the peak of the molecular weight distribution of the polymer produced in the first polymerization step accords with the molecular weight curve of the ethylene polymer obtained after the second polymerization step, viz. the final polymer. Specific calculation was carried out by the least square method so that the differential fractions in the above described range accord with each other.

$$S=\Sigma(w_i-W_1\times w_{1,i})^2=\text{the least},$$

$$W_2=1-W_1,$$

wherein $W_1$ and $W_2$ are the weight fraction of the polymer produced in the first and second polymerization step, respectively, $w_{1,i}$ is the differential weight fraction in the i-th molecular weight of the polymer produced in the first polymerization step, and $w_i$ is the differential weight fraction in the i-th molecular weight of the ethylene polymer obtained after the second polymerization step.

Figure 1:
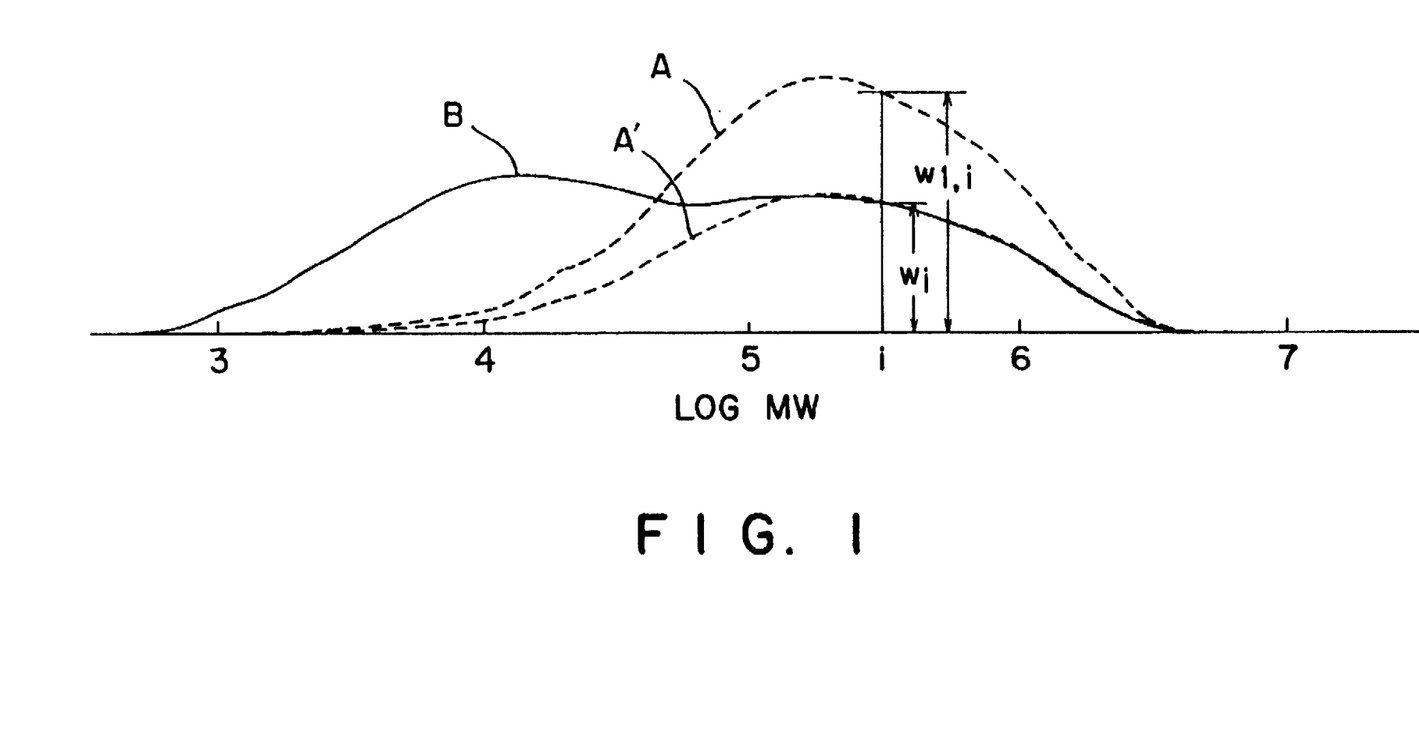
FIG. 1 illustrates the result of calculation for estimating the weight fraction ($W_1$) of the polymer component produced in the first step.

Typical calculation results are illustrated in FIG. 1.

In FIG. 1, A represents the differential molecular weight distribution curve of the polymer produced in the first polymerization step, and B represents the differential molecular weight distribution curve of the ethylene polymer obtained after the second polymerization step, viz. the final polymer.

$w_i$ and $w_{1,i}$ indicate the i-th differential weight fractions.

A' represents a differential molecular weight distribution curve calculated by multiplying the differential molecular weight distribution curve (A) of the polymer produced in the first polymerization step by the weight fraction ($W_1$) obtained by calculation.

<Molecular weight ($M_2$) at which the integral fraction from the low molecular weight equals to ½ of the weight fraction ($W_2$) of the ethylene polymer produced in the second polymerization step>

The molecular weight distribution of the ethylene polymer obtained after the second polymerization step, viz. final polymer, was integrated from the lower molecular weight side to give an integrated molecular weight distribution curve, and the molecular weight which was equal to ½ of the weight fraction of the ethylene polymer ($W_2$) produced in the second polymerization step was defined as $M_2$.

<Weight Average Molecular Weight>

The weight average molecular weight which is the most important structural factor in the present invention was measured under the following conditions, because the weight average molecular weight is generally measured by SEC, but in the case where a trace amount of super-high molecular materials is contained it is difficult to measure correctly the trace amount of ingredients due to several problems such as the exclusive limit of SEC or the detection sensitivity.

The apparatus used in the measurement was the one in which use is made of the SEC-LALLS method wherein ALC/GPC 150C manufactured by Waters was used as SEC, the SEC column was connected through a temperature controlled transfer tube to a low angle laser light scattering photometer (LALLS; KMX-6, manufactured by Chromatix), of which flow cell was on-line connected in series through a temperature-controlled transfer tube to a differential refractometer attached to SEC. No filter other than an insert filter (Item No. 88084, manufactured by Waters) was used between the automatic injection port and the column of SEC. Also, as a conduit through which a sample solution is flown a stainless steel tube having an internal diameter of 0.02 inch was used.

As for the preparation of a solution, 20 mg of a sample was weighed precisely, to which 20 ml of an eluent having BHT added thereto was added, the resultant mixture was stirred several times for 2 hours in an air thermobath at 140° C., then heated at 140° C. for further 1 hour, transferred in the form of solution into a sample bottle for automatic injection which had been previously heated at the same temperature to make a solution for measurement. No filtration was carried out in this dissolution procedure.

The other measuring conditions are as follows.

SEC

Column: UT806M×2, (PS gel particle diameter: 30 μm), Showa Denko K.K.,

Solvent: 1,2,4-trichlorobenzene (BHT, 2 mg/ml), Wako Pure Chemical Industries, Ltd., Special Grade Chemical, Temperature 140° C., Injection amount: 300 μl, Concentration: 1 mg/ml, Flow rate: 0.5 ml/min (a level set; the practical flow rate was obtained as the eluting volume by sampling the solvent from the outlet conduit of the differential refractometer after the apparatus had been stabilized under the above described conditions to measure the mass per unit time, which was then divided by the solvent density ( 1.316 g/cm$^3$) at 135° C. to give the real flow volume.),

LALLS

Temperature: 135° C.,

Cell: 10 μl stainless steel flow cell,

Filled stop: 0.2 mm,

Time constant: 0.3 sec,

Apparent scattering angle: 6° to 7°,

Transfer tube

Temperature: 135° C.

The weight average molecular weight (Mw) was calculated according to the following equation.

$$Mw=[\Delta V/(K\times m)]\times\Sigma\overline{R}_{\theta,i}$$

wherein $\Delta V$ represents the difference between the eluted volumes $V_i$ and $V_{i+1}$, K represents an optical constant which is represented by the following equation, m represents the weight of a sample injected which is obtained from the following equation with the aid of the concentration ($C_o$), the injected volume ($V_{inj}$), and the expansion coefficient ($\alpha$) of a solvent used. The expansion coefficient of the solvent is a value of the density of a solvent at 25° C. divided by the density of the solvent at 140° C., and 1.117 was used as the expansion coefficient.

$m=C_O\times V_{inj}/\alpha$, $\overline{R}_{\theta,i}=[\{G_\theta(\text{solution}),i-G_\theta(\text{solvent})\}/G_O]\times(D/\sigma'l')$.

$\overline{R}_{\theta,i}$ is a reduced scattering strength at $V_i$.

$K=(2\pi n^2)/(\lambda^4 N_A)\times(dn/dc)^2\times(1+\cos^2\theta)$, n: refractory index of the solvent (1.502), λ: wave length of incident laser light (632.8 nm), $N_A$: Avogadro constant (6,022×10$^{23}$), dn/dc: refractory index per increased concentration (−0.104 ml/g), θ: scattering angle (4.322°), $G_O$: signal strength of the incident light, $G_\theta(\text{solution})_{,i}$: signal strength of the scattering light in the solution at $V_i$, $G_0$(solvent): signal strength of the scattering light in the solvent, D: the ratio ($D_s/D_o$) of filter transmittance ($D_s$) on measuring the scattering light and filter transmittance ($D_o$) on measuring the strength of the incident light, σ'l': scattering length (apparatus constant).

When the weight average molecular weight of the ethylene polymer produced in the first polymerization step is represented by $Mw_{,1}$ (measured by the SEC-LALLS method) and the weight average molecular weight of the ethylene polymer obtained after the second polymerization step, viz. the final polymer, is represented by Mw (measured by the SEC-LALLS method), the weight average molecular weight of the ethylene polymer ($Mw_{,2}$) produced only in the second polymerization step is calculated by the following equation:

$$Mw_{,2}=(Mw-W_1\times Mw_{,1})\div W_2.$$

<Melt Index>

Melt index (MI) is a value which is measured with a load of 2.16 kg at a temperature of 190° C. according to JIS K-6760 method and has a unit of g/10 min.

<Density>

Density was measured according to JIS K-6760 method.

<Bubble Stability, Maximum Discharge and Resin Pressure>

These values were measured with an inflation molding apparatus (50 mmφ, L/D 24, manufactured by Mitsubishi Heavy Industries, Ltd., Japan) equipped with a screw of full-flight type and having a die diameter of 50 mmφ, a lip width of 1.2 mm and an inside mandrel diameter of 50 mm, and the apparatus was cooled by air cooling with the aid of an airing. Molding was conducted at a cylinder and die temperature of 200° C. with a blow ratio of of 4.0 and a taking up rate of 25 m/min.

The bubble stability on the inflation molding was evaluated according to the following. When an operation of inflation molding where a bubble is stably formed in contact with an inside mandrel is modified so that, the discharge is increased by slowly increasing the rotations of an extruder screw while the taking up rate and the blow ratio are kept constant, and the bubble begins rolling or pitching. The discharge is then set at the level of its maximum where the bubble can be stably formed, and the discharge per unit time is measured to obtain a value of the stable maximum discharge of a bubble as an indication of the bubble stability.

As for the maximum discharge, a discharge is measured at a constant screw rotation of 75 rpm under the conditions of the bubble stability test.

The resin pressure is a pressure in front of the die at a discharge of 18.5 kg/hour accomplished by controlling the screw rotations.

EXAMPLE 1

<Synthesis of Catalyst>

In an autoclave having an internal volume of 10 liter and thoroughly purged with $N_2$ were placed 2 liter of heptane and 250 g of $MgCl_2$ at room temperature with stirring, and the temperature was raised to 90° C. 1.81 liter of titanium tetrabutoxide and 54 cc of butanol were then added to the mixture to dissolve $MgCl_2$ over a period of 75 minutes. The solution was cooled to 40° C., 395 cc of methyl hydropolysiloxane was added, and the mixture was caused to react for 4 hours to precipitate particles. The particles were washed thoroughly with heptane to produce a carrier material.

625 g of the particles were dispersed in heptane to a concentration of 200 g/liter, 69 cc of ethylaluminum dichloride (25% by weight heptane solution) and 394 cc of $SiCl_4$ were sequentially added at 30° C., and the mixture was further heated to 90° C. for reaction for 3 hours. Then, the reaction product was washed thoroughly with heptane.

190 g of the above described catalyst component thus obtained was dispersed in heptane to a concentration of 30 g/liter, 500 cc of ethylaluminum dichloride (25% by weight heptane solution) was added dripwise over a period of 30 minutes, and the mixture was caused to react for 2 hours. The mixture was then washed thoroughly with heptane.

<Preliminary Polymerization>

In an autoclave having an internal volume of 10 liter and purged thoroughly with $N_2$ was placed 120 g of the catalyst component, and heptane was added to a form a slurry in concentration of 20 g/liter. The mixture was heated with stirring to 80° C. and kept at the same temperature. Next, 120 g of tri-iso-butylaluminum (20% by weight heptane solution) was added, $H_2$ was introduced in an amount of 0.5 kg/cm², and ethylene was supplied at an amount of 1.6 liter/min for 3 hours. After the pressure was discharged, the reaction mixture was washed thoroughly with heptane and dried with vibration under reduced pressure at 60° C. for 3 hours.

Next, 14 g of $TiO_2$ (Nippon Aerosil, "TP25") was added, vibrational mixing was continued for 60 minutes, 14 g of $SiO_2$ (Nippon Aerosil, "Aerosil 200") was further added to continue mixing with vibration for 60 minutes. Thus, 498 g of a powdery catalyst having undergone preliminary polymerization was obtained.

<Co-polymerization of Ethylene and Butene>

Continuous polymerization in two polymerization vessels of ethylene was conducted in the presence of butene as a comonomer with the same vapor phase polymerization apparatus in a fluidized bed as described in FIG. 1 of Japanese Patent Laid-Open Publication No. 86122/1993. The reaction conditions are shown in Table 1, and the results are shown in Table 2.

EXAMPLES 2 AND 3

Ethylene and butene were copolymerized in the same manner as in Example 1 except that the reaction conditions were changed into those listed in Table 1. The results are shown in Table 2.

COMPARATIVE EXAMPLES 1 AND 2

A catalyst supported on silica was prepared according to the method described in Example 4 (a) of U.S. Pat. No. 4,888,318 in which a $MgCl_2\cdot TiCl_3\cdot$tetrahydrofuran complex was supported on silica. The catalyst comprised 1.15% by weight of Ti, 1.86% by weight of Mg, 15.1% by weight of tetrahydrofuran and 1.49% by weight of Al. Ethylene and butene were copolymerized with the catalyst supported on silica under the conditions set forth in Table 1. The results are shown in Table 2.

COMPARATIVE EXAMPLES 3 AND 4

Ethylene and butene were copolymerized in the same manner as in Example 1 except that polymerization conditions were changed into those listed in Table 1 with the same catalyst as used in Example 1. The results are shown in Table 2.

TABLE 1

Polymerization conditions

| | Polymerization temperature (°C.) | Polymerization pressure (kg/cm²-G) | $H_2/C_2$ (vol/vol) | $C_4/C_2$ (vol/vol) | Catalyst feed amount (g/h) | Organo-aluminum feed amount (ml/h) | Total P.R. (kg/h) |
|---|---|---|---|---|---|---|---|
| Example 1 | 85 | 18 | 0.054 | 0.011 | 4.38 | 170 (TIBA) | 15.0 |
| | 110 | 30 | 2.2 | 0.044 | 0 | 0 | |
| Example 2 | 85 | 18 | 0.045 | 0.017 | 3.71 | 170 (TIBA) | 15.6 |
| | 110 | 34 | 2.2 | 0.015 | 0 | 0 | |
| Example 3 | 85 | 18 | 0.046 | 0.015 | 3.71 | 170 (TIBA) | 15.5 |
| | 110 | 34 | 2.3 | 0.017 | 0 | 0 | |
| Comparative Example 1 | 74 | 16 | 0.026 | 0.052 | 4.59 | 80 (TEA) | 12.5 |
| | 110 | 30 | 2.5 | 0.053 | 0 | 60 (TEA) | |
| Comparative Example 2 | 74 | 18 | 0.028 | 0.050 | 9.15 | 130 (TEA) | 20.5 |
| | 110 | 32 | 2.4 | 0.048 | 0 | 110 (TEA) | |
| Comparative Example 3 | 85 | 18 | 0.032 | 0.051 | 6.25 | 110 (TIBA) | 17.2 |
| | 105 | 32 | 3.0 | 0.020 | 0 | 100 (TIBA) | |
| Comparative Example 4 | 85 | 18 | 0.035 | 0.030 | 7.17 | 200 (TIBA) | 16.2 |
| | 105 | 34 | 2.5 | 0.029 | 0 | 100 (TIBA) | |

Upper step: the first polymerization step,
Lower step: the second polymerization step,
P.R.: Production Rate,
Organoaluminum feed amount means 7% hexane dilution feed amount.

TABLE 2

Results

| | MFR (g/10 min) | Density (g/cm³) | Rate of high molecular weight ($W_1$) | $Mw_{,1} \times 10^4$ | $Mw_{,2}/Mw_{,1}$ | $M_2 \times 10^4$ | Resin pressure (kg/cm²) | Extrusion amount (kg/h) | Bubble stability (kg/h) |
|---|---|---|---|---|---|---|---|---|---|
| Example 1 | 0.074 | 0.952 | 0.52 | 106 | 1.04 | 0.86 | 280 | 27.1 | 22.4 |
| Example 2 | 0.079 | 0.953 | 0.52 | 100 | 0.82 | 0.98 | 265 | 28.3 | 22.0 |
| Example 3 | 0.064 | 0.953 | 0.56 | 91 | 0.97 | 0.95 | 285 | 27.7 | 22.2 |
| Comparative Example 1 | 0.070 | 0.951 | 0.57 | 57 | 0.18 | 0.85 | 290 | 26.5 | 15.6 |
| Comparative Example 2 | 0.071 | 0.949 | 0.57 | 51 | 0.21 | 0.85 | 290 | 28.3 | 16.5 |
| Comparative Example 3 | 0.042 | 0.942 | 0.64 | 90 | 0.33 | 0.90 | 365 | 20.2 | 17.5 |
| Comparative Example 4 | 0.078 | 0.949 | 0.58 | 83 | 0.65 | 0.85 | 315 | 27.8 | 19.0 |

What is claimed is:

1. An ethylene polymer which is a homopolymer of ethylene or a copolymer of ethylene with an α-olefine having 3 to 10 carbon atoms which is obtained by performing a first polymerization step and then a second polymerization step in which polymerization is continuously conducted in the presence of a polymer obtained in the first polymerization step, said ethylene polymer satisfying the following conditions (a) to (d):

(a) the polymer produced in the first polymerization step has an weight average molecular weight ($Mw_{,1}$) in the range of $6 \times 10^5$ to $4 \times 10^6$;

(b) the ratio ($Mw_{,2}/Mw_{,1}$) of the weight average molecular weight of the polymer produced in the first polymerization step ($Mw_{,1}$) and the weight average molecular weight of the polymer produced in the second polymerization step ($Mw_{,2}$) being in the range of 0.7 to 1.4;

(c) the molecular weight ($M_2$) at which the integration fraction from the low molecular weight is equal to ½ of the weight fraction ($W_2$) of the polymer produced in the second polymerization step is in the range of $5 \times 10^3$ to $3 \times 10^4$; and (d) the weight fraction ($W_1$) of the polymer produced in the first step is in the range of 0.45 to 0.70, and the weight fraction ($W_2$) of the polymer produced in the second step is in the range of 0.30 to 0.55.

2. An ethylene polymer according to claim 1, wherein the density is in the range of 0.940 to 0.960 g/cm³.

3. An ethylene polymer according to claim 2, wherein the melt index (MI) is in the range of 0.02 to 0.7 g/10 min.

4. An ethylene polymer according to claim 1, which is produced by preforming the first and second polymerization steps by the continuous vapor phase polymerization method in two reactors.

5. An ethylene polymer according to claim 1, wherein $Mw_{,1}$ is in the range of $6 \times 10^5$ to $2 \times 10^6$.

6. An ethylene polymer according to claim 5, wherein $Mw_{,1}$ is in the range of $8 \times 10^5$ to $2 \times 10^6$.

7. An ethylene polymer according to claim 1, wherein $Mw_{,2}/Mw_{,1}$ is in the range of 0.8 to 1.4.

8. An ethylene polymer according to claim 7, wherein $Mw_{,2}/Mw_{,1}$ is in the range of 0.8 to 1.3.

9. An ethylene polymer according to claim 1, wherein $M_2$ is in the range of $5 \times 10^3$ to $2 \times 10^4$.

10. An ethylene polymer according to claim 1, wherein $W_1$ is in the range of 0.45 to 0.60.

11. An ethylene polymer according to claim 1, wherein $W_2$ is in the range of 0.40 to 0.55.

12. An ethylene polymer according to claim 1, wherein the conditions (a)–(d) are as follows:

| | |
|---|---|
| $Mw_{,1}$: | $6 \times 10^5$ to $2 \times 10^6$ |
| $Mw_{,2}/Mw_{,1}$: | 0.8 to 1.4 |
| $M_2$: | $5 \times 10^3$ to $2 \times 10^4$ |
| $W_1$: | 0.45 to 0.60 |
| $W_2$: | 0.40 to 0.55. |

13. An ethylene polymer according to claim 1, wherein the conditions (a)–(d) are as follows:

| | |
|---|---|
| $Mw_{,1}$: | $8 \times 10^5$ to $2 \times 10^6$ |
| $Mw_{,2}/Mw_{,1}$: | 0.8 to 1.3 |
| $M_2$: | $5 \times 10^3$ to $2 \times 10^4$ |
| $W_1$: | 0.45 to 0.60 |
| $W_2$: | 0.40 to 0.55. |

* * * * *